2,973,337
PROCESS FOR THE POLYMERIZATION OF UNSATURATED COMPOUNDS, USING A BORAZANE CATALYST

Rudolf Stroh, Leverkusen-Bayerwerk, Wilhelm Sutter and Anton Robert Heinz, Leverkusen, and Hans Haberland, Leverkusen-Bayerwerk, Germany, assignors to Farbenfabriken Bayer Aktiengesellschaft, Leverkusen, Germany, a corporation of Germany No Drawing. Filed July 29, 1958, Ser. No. 751,626
Claims priority, application Germany Aug. 2, 1957
7 Claims. (Cl. 260—45.4)

This invention relates to a process for polymerizing unsaturated compounds, the process being characterised in that the polymerization is carried out in the presence of borazanes.

Unsaturated compounds suitable for the polymerization in accordance with the process of the invention include monoethylenically and polyethylenically unsaturated compounds for example alpha-beta monoethylenically unsaturated carboxylic acids such as acrylic acid, methacrylic acid, the nitriles of such acids as for instance acrylonitrile, methacrylonitrile, esters of alpha-beta monoethylenically unsaturated carboxylic acids with monohydric or polyhydric saturated or unsaturated alcohols having 1 to 20 carbon atoms such as methylmethacrylate, methylacrylate, dodecylmethacrylate, maleic acid monomethylester, fumaric acid diethylester, acrylic acid cyclohexylester, glycoldimethacrylate, the amides of said acids, vinyl esters, such as for example vinylchloride, vinylacetate, vinylpropionate, vinylbenzoate, 1.1-dichlorethene, conjugated diolefines having 4-6 carbon atoms, such as butadiene, isoprene, 2-chlorobutadiene-1.3 (chloroprene), dimethylbutadiene vinylaromatic compounds such as styrene, alpha-methylstyrene, p-chlorostyrene, p-methylstyrene, furthermore isobutylene and other unsaturated compounds containing one or more ethylenic double bonds which can be polymerized by conventional polymerization methods with the aid of radical-forming catalysts such as peroxides. It is also possible for mixtures of such monomers including mixtures of ethylenically unsaturated linear polyesters with monomers which are copolymerizable therewith, such as mixtures of styrene or diallylphthalate with polyesters of dihydric alcohols and dicarboxylic acids at least part of said dicarboxylic acids being ethylenically unsaturated (maleic acid, fumaric acid) to be copolymerized by the process of the invention.

Examples of borazanes suitable for the process of the present invention are those of the general formula

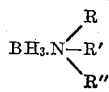

in which R, R' and R'' each represent an alkyl, cycloalkyl or aralkyl radical and R, R', and R'' can be different from or the same as one another. Suitable substituents are for instance methyl-, ethyl-, propyl-, butyl-, isobutyl-, cyclopentyl-, cyclohexyl-, benzyl-radicals. The following borazanes are examples: trimethyl borazane $(CH_3)_3N.BH_3$, triethyl borazane $(C_2H_5)_3N.BH_3$, tri-n-propyl borazane $(C_3H_7)_3N.BH$, dimethyl cyclohexyl borazane $(CH_3)_2(C_6H_{11})N.BH_3$, and dimethyl benzyl borazane.

The unsaturated compounds can be polymerized in bulk, in solution or in aqueous emulsion or dispersion at ordinary pressure or under increased pressure. Examples of solvents are hydrocarbons such as aliphatic hydrocarbons (benzine, cyclohexane), aromatic hydrocarbons (benzene, toluene), chlorinated hydrocarbons such as chlorobenzene, ethylenechloride, chloroform, or hydrophilic solvents such as dimethyl formamide, alcohols (ethanol, propanol, tert. butanol), or ethers, such as dibutylether, 1.4-dioxane or tetrahydrofurane, ketones, such as acetone, cyclohexanone; water is also suitable. The pH value of the polymerization medium is preferably adjusted between 3 and 9.

Suitable solvents can be chosen for use in the process to give a solution or a suspension of the polymer. The polymerization temperature may vary within wide limits, temperatures in the range of 10°–120° C. being preferred.

The borazanes are advantageously used in a proportion of 0.1 to 1% by weight based on the monomers to be polymerised, but it is readily possible to use smaller or larger proportions such as proportions up to 2%. The molecular weight of the resulting polymer can be regulated by the quantity of borazane which is used.

The borazanes are soluble in practically all organic solvents, so that, in addition to their capacity for being measured out satisfactorily, the main advantage of using them is that they can be mixed as desired and in a compatible manner with other catalysts with a free-radical-forming action and also with the monomers dissolved or emulsified in a solvent.

The polymerization generally starts after a short induction period. In certain circumstances, it is even possible to work in the presence of polymerization inhibitors, which are to prevent a premature undesired polymerization. For example, chlorobutadiene, in the presence of small proportions of normal stabilisers such as phenthiazine, can be polymerised in the presence of the catalysts in accordance with the invention to provide final products with favourable properties.

The embodiment of the process which is simplest from a commercial point of view consists in dissolving the borazanes, which are soluble in practically all organic solvents in the monomers, dissolving the other additives in another monomer or in a non-polymerisable solvent, and mixing the two solutions while stirring. Additives which can be used include organic or inorganic peroxides such as benzoylperoxide, dibutyryl peroxide, peracetic acid, and other oxidizing agents such as hypochlorites (sodium hypochlorite), persulphates (potassium persulphate), permanganates (potassium manganate), perborates (sodium perborate), the concurrent use of which is in most cases advantageous but is not absolutely necessary. These free radical forming peroxides and oxydizing agents which easily split off oxygen are preferably applied in amounts of 0.1 to 10% by weight as calculated on the weight of the monomers to be polymerised or copolymerised.

The working up process takes place in the usual manner by filtering off the solvent used in suspension polymerization. When aqueous polymer emulsions are formed, these emulsions can bt broken with the conventional agents such as salts, alcohols or acids and the solid polymers can be separated by filtration and washed. Solutions can be used as such, or the polymer can be precipitated by means of a non-solvent for the polymer.

The polymers can be used in known manner as elastomers, as raw materials for the manufacture of fibres, for films and foils or for plastic compositions, for example.

Example 1

700 cc. of water and 5.1 grams of potassium persulphate are heated to 40° C. in a stirrer-type vessel with a gas supply pipe and dropping funnel and air is removed by introducing nitrogen. A mixture of 150 grams of acrylonitrile and 0.6 gram of triethyl borazane are run into this solution over a period of 5 hours while passing through a very gentle stream of nitrogen which can exclude air from the apparatus. After the slow addition is complete, the reaction temperature of 40° C. is maintained for another hour. A thick paste of polyacrylonitrile in water is formed, from which the polyacrylonitrile is recovered by filtering with suction and washing. It can be spun from a solution or from a melt to provide fibres with good textile properties. K-value according to Fikentscher 79.5; intrinsic viscosity η=1.55. (The K-value according to Fikentscher is defined in "Cellulosechemie" 13 (1932), page 60.)

*Example 2*

If only 0.4 gram of triethyl borazane is used when carrying out the same process as set out in Example 1, a polyacrylonitrile is obtained with a K-value of 96.5 and an intrinsic viscosity η of 2.21.

*Example 3*

If a mixture of 142.5 grams of acrylonitrile and 7.5 grams of methyl acrylate is used instead of 150 grams of acrylonitrile when the procedure set out in Example 1 is used, a polyacrylonitrile copolymer is obtained with a K-value of 76.9 and an intrinsic viscosity η of 1.32.

*Example 4*

500 cc. of water are made free from air by means of nitrogen at 40° C. and 8 grams of potassium persulphate are added. This solution has added thereto as emulsifier 3 grams of an 80% paste of sodium sulphonates or longchain hydrocarbons (member of C-atoms about 12–16). A mixture of 150 grams of styrene and 1.0 gram of triethyl borazane is run in over a period of 5 hours while stirring. An emulsion is formed which is freed from styrene residues by steam distillation and precipitated with sodium chloride solution, whereafter it is washed and dried. K-value=65; η=1.12.

It is possible in analogous manner to polymerize mixtures of acrylonitrile and styrene, as well as methyl methacrylate and acrylic acid esters.

*Example 5*

15.0 grams of methacrylic acid methyl ester are freed from air by reducing the pressure, 7.5 grams thereof are mixed with 100 mg. of trimethyl borazane, and the other half is mixed with 0.5 gram of cumene hydroperoxide (50%, from the oxidation of cumene). The two solutions are combined in a tube closed at one end and under nitrogen. After standing overnight, a hard rod is formed.

*Example 6*

10 grams of 1.1-dichloroethene and 100 mg. of tri-n-propyl borazane are dissolved in 100 cc. of tetrahydrofurane (free from air). This mixture has added thereto a solution of 0.5 gram of the addition product

in 50 cc. of tetrahydrofurane. This solution must also be free from oxygen. The mixture is left to stand under nitrogen for 3 hours at 30° C. and the viscous solution which is formed is poured into a large quantity of methanol to form a precipitate. The fine polymer which precipitates in granular form is filtered off with suction, washed with methanol and dried. The K-value in chlorobenzene is 70; η=1.23.

*Example 7*

200 grams of distilled 2-chlorobutadiene-1.3 and 0.84 gram of n-dodecyl mercaptan as regulator are introduced into a 1-litre 3-neck flask which is equipped with a thermometer, reflux condenser and stirring means. There is then added a solution of 8 grams of the sodium salt of a disproportionated abietic acid as emulsifier, 1.6 grams of a condensation product of naphthalene sulphonic acid and formaldehyde as further emulsifier and 1.8 grams of sodium hydroxide in 280 grams of water. After heating to 50° C., the flask is flushed for a short time with nitrogen and the polymerization initiated by adding 0.5 gram of triethyl borazane. The yield of polymer reaches a solid content of 32% (80% of the introduced monomer) after about 7 hours, whereupon the polymerization is stopped by adding 0.5 gram of phenthiazine (dissolved in three times the quantity of benzene and emulsified with 8 times the quantity of a 2% aqueous solution of sodium sulphonates of relatively longchain hydrocarbons). The emulsion is freed from the residual 2-chlorobutadiene-1,3 and also from the benzene in vacuo at 30–40° C. and coagulated with saturated sodium chloride solution. The polymer is finally washed with water on a washing roller and dried in vacuo at 60° C.

*Example 8*

200 grams of 2-chlorobutadiene-1.3, stabilised with 0.1 gram of phenthiazine, are combined as in Example 7 with n-dodecyl mercaptan and the said aqueous solution. After heating to 55° C. and driving off the oxygen by means of nitrogen, 0.4 gram of triethyl borazane and 0.4 gram of menthane hydroperoxide are added. The yield after 12 hours is about 70%; the working up procedure is as set out in Example 7.

The above borazanes are described in the literature as for instance in "Gmelins Handbuch der anorg. Chemie," 8th edition, Ergänzungsband 1954, System No. 13, page 236, paragraph 6. The following prescription is given for the preparation of the borazanes which is applicable to the production of all borazanes disclosed above.

An 8 to 10% aqueous solution of an alkaline metal boranate has added thereto the same volume of diethylether and thereafter the equivalent amount of the corresponding amine. The mixture is cooled to 0 to 5° C. Thereafter $CO_2$ is introduced in the reaction mixture while stirring. After about 15 minutes development of hydrogen sets in which is terminated after about 2 to 3 hours. The ethereal solution is separated from the aqueous and the latter is extracted several times with ether. The combined ethereal solutions are evaporated and the residue is distilled in case that the borazane is a liquid. Solid borazanes are recrystallized from aliphatic hydrocarbons such as n-heptane or ligroine.

We claim:

1. A process for the polymerization of an ethylenically unsaturated compound which is polymerisable in the presence of a free radical forming catalyst which comprises polymerising the compound in the presence of an initiator comprising a borazane of the formula

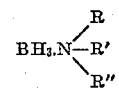

wherein R, R′ and R″ each represent a radical selected from the group consisting of alkyl, cycloalkyl, and aralkyl radicals.

2. A process according to claim 1, wherein the initiator comprises a borazane and a compound splitting off oxygen under the polymerization conditions.

3. A process according to claim 1, wherein the polymerization is carried out by the bulk method.

4. A process according to claim 1, wherein the polymerization is carried out in solution.

5. A process according to claim 1, wherein the polymerization is carried out in aqueous dispersion.

6. A process according to claim 1, wherein the compound to be polymerised is a compound selected from the group consisting of alpha-beta ethylenically unsaturated carboxylic acids, the esters, nitriles and amides of said acids, vinylesters, conjugated dienes having 1 to 4 carbon atoms, and vinyl aromatic compounds.

7. A process according to claim 1, wherein at least two ethylenically unsaturated compounds, which are copolymerisable in the presence of a free radical forming catalyst, are copolymerised with each other.

References Cited in the file of this patent

UNITED STATES PATENTS 2,387,517    Kraus _____ Oct. 23, 1945